(12) United States Patent
Baldwin

(10) Patent No.: US 12,455,023 B2
(45) Date of Patent: Oct. 28, 2025

(54) BUILT-IN END COUPLING FOR HIGH PRESSURE REINFORCED BONDED RUBBER HOSE ASSEMBLIES

(71) Applicant: Captent Inc., Houston, TX (US)

(72) Inventor: Gardner T. Baldwin, Houston, TX (US)

(73) Assignee: Captent Inc., Houston, TX (US)

( * ) Notice: Subject to any disclaimer, the term of this patent is extended or adjusted under 35 U.S.C. 154(b) by 1049 days.

(21) Appl. No.: 16/941,667

(22) Filed: Jul. 29, 2020

(65) Prior Publication Data

US 2021/0033223 A1 Feb. 4, 2021

Related U.S. Application Data

(60) Provisional application No. 62/880,515, filed on Jul. 30, 2019.

(51) Int. Cl.
| | |
|---|---|
| *F16L 13/11* | (2006.01) |
| *B29C 39/42* | (2006.01) |
| *F16L 11/08* | (2006.01) |
| *B29C 43/36* | (2006.01) |

(52) U.S. Cl.
CPC .............. *F16L 13/11* (2013.01); *B29C 39/42* (2013.01); *F16L 11/088* (2013.01); *B29C 2043/3644* (2013.01)

(58) Field of Classification Search
CPC ........ F16L 13/11; F16L 13/103; F16L 13/116; F16L 33/34; B29C 65/483; B29C 39/42; B29C 2043/3605; B29C 2043/3644; B29C 2045/1731

USPC ....................................... 285/290.3; 156/423
See application file for complete search history.

(56) References Cited

U.S. PATENT DOCUMENTS

| | | | | |
|---|---|---|---|---|
| 3,531,143 | A * | 9/1970 | Sandor | F16L 33/34 138/109 |
| 3,904,808 | A * | 9/1975 | Kriechbaum | H01R 9/0503 285/294.3 |
| 4,353,581 | A * | 10/1982 | Eisenzimmer | F16L 33/34 285/294.1 |
| 4,477,108 | A * | 10/1984 | Castelbaum | F16L 33/34 138/109 |
| 4,605,466 | A * | 8/1986 | Eisenzimmer | F16L 33/34 285/915 |
| 4,850,619 | A * | 7/1989 | Lantos | F16L 33/34 285/915 |

(Continued)

FOREIGN PATENT DOCUMENTS

| | | |
|---|---|---|
| CN | 109404645 A | 3/2019 |
| EP | 0221714 A1 | 5/1987 |
| WO | 2014080216 A1 | 5/2014 |

*Primary Examiner* — David Bochna

(57) ABSTRACT

One aspect of the disclosure is a method of attaching a hose coupling to a reinforced hose. In one embodiment, the method comprises: skiving the first end of the reinforced hose to expose at least one reinforcing layer of a plurality of reinforcing layers of the reinforced hose; positioning the skived first end of the reinforced hose in an inner cavity of the hose coupling; introducing a vacuum into the inner cavity through a vent port in the hose coupling; and introducing a bonding agent into the cavity through an injection port in the hose coupling, wherein the bonding agent is drawn by the vacuum into the plurality of reinforcing layers of the reinforced hose.

12 Claims, 3 Drawing Sheets

(56) References Cited

U.S. PATENT DOCUMENTS

| | | | |
|---|---|---|---|
| 2002/0190522 A1* | 12/2002 | Grepaly | F16L 33/34 |
| | | | 285/222.1 |
| 2015/0252929 A1* | 9/2015 | Jaspaert | B29C 65/4835 |
| | | | 285/41 |
| 2021/0172548 A1* | 6/2021 | Dhagat | F16L 33/18 |

* cited by examiner

BUILT-IN END COUPLING FOR HIGH PRESSURE REINFORCED BONDED RUBBER HOSE ASSEMBLIES

CROSS-REFERENCE TO RELATED APPLICATION

This application claims the benefit of U.S. Provisional Application Ser. No. 62/880,515, filed by Captent, Inc. on Jul. 30, 2019, entitled "Built-In End Coupling for High Pressure Bonded Reinforced Rubber Hose Assemblies," commonly assigned with this application and incorporated herein by reference in its entirety.

TECHNICAL FIELD

This application is directed, in general, to reinforced rubber hose assemblies and in particular to the hose couplings used to terminate large diameter high pressure flexible reinforced rubber hose assemblies used in the energy, marine, petrochemical and like industries which can meet the newer API (American Petroleum Institute) standards.

BACKGROUND

High-pressure rubber hose is used in many instances in industry but particularly in the mining, construction, energy, marine and petrochemical industries. Flexible rubber hose is used to transfer fluids under various pressures and temperature between two points, one or both of which, may move relative to each other or to another fixed point in space. Hose couplings with end connectors specified by the purchaser are required on each end of the hose.

In the drilling industry, a flexible rubber hose runs between the pump piping system on the rig and the swivel or top drive that is coupled to the rotating drill string. The pump system forces drilling fluid down the center of the drill pipe, which returns through the wellbore, in order to flush cuttings from the wellbore (plus provide wellbore stability, etc.). In this instance, the flexible hose is subjected to high pressures. The high pressure is required to both transfer drilling fluid into the wellbore while overcoming the static wellbore pressures—the deeper the wellbore, the higher the pressure.

The rotary drilling hose is subject to further stress in that it hangs within the derrick supported at either end by the hose coupling on the hose and the fact that, depending upon the type of rig, the swivel or top drive unit is moved up and down with the traveling block literally thousands of times during the drilling operation. This means that the hose is subject to additional stress at the coupling (in addition to being subject to stress throughout its length). Thus, a highly reliable bond between the hose and the coupling is required to meet the service requirements as well as for protection of personnel and equipment. If the hose breaks loose from the coupling, it could easily fall and cause severe damage on the drill floor of the rig. In a similar manner, if the hose breaks, circulation may be lost and potentially resulting in a well blowout.

SUMMARY

One aspect of the disclosure is a method of attaching a hose coupling to a reinforced hose. In one embodiment, the method comprises: skiving the first end of the reinforced hose to expose at least one reinforcing layer of a plurality of reinforcing layers of the reinforced hose; positioning the skived first end of the reinforced hose in an inner cavity of the hose coupling; introducing a vacuum into the inner cavity through a vent port in the hose coupling; and introducing a bonding agent into the cavity through an injection port in the hose coupling, wherein the bonding agent is drawn by the vacuum into the plurality of reinforcing layers of the reinforced hose.

Another aspect of the disclosure is a reinforced hose assembly. In one embodiment, the reinforced hose assembly comprises a reinforced hose and at least one hose coupling. In one embodiment, the reinforced hose comprises a skived first end with a leading edge, a second end opposite the skived end, a plurality of reinforcing layers therein, and an outer cover. In one embodiment, the at least one hose coupling comprises an inner cavity having a coupling end and an aft end opposite the coupling end, a vent port, and an injection port. In one embodiment the skived first end of the reinforced hose is skived to expose at least one reinforcing layer of the plurality of reinforcing layers, the skived first end of the reinforced hose is positioned in the inner cavity of the at least one hose coupling, a vacuum is introduced the inner cavity of the at least one hose coupling through the vent port, a bonding agent is introduced to the inner cavity of the at least one hose coupling through the injection port, and the bonding agent is drawn by the vacuum into the plurality of reinforcing layers of the reinforced hose.

BRIEF DESCRIPTION OF THE DRAWINGS

Reference is now made to the following descriptions taken in conjunction with the accompanying drawings, in which:

FIG. 7 shows a woven carbon-fiber sock which can be used as an additional reinforcement according to one or more examples of the disclosure; and.

DETAILED DESCRIPTION

Figure 1:
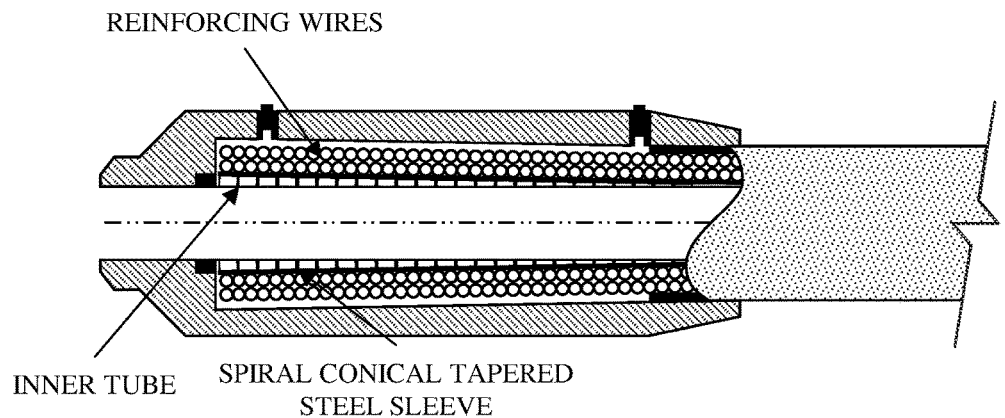
FIG. 1 illustrates a generic fully assembled and cured cut-away of the current state of the art in a built-in or factory coupling.

Specific examples are described in detail and are shown in the drawings, with the understanding that the present disclosure is to be considered an exemplification of the principles of the disclosure, and is not intended to limit the disclosure to that illustrated and described herein. It is to be fully recognized that the different teachings of the examples discussed herein may be employed separately or in any suitable combination to produce desired results.

In order to obtain a high-pressure flexible rubber hose (the term rubber is used generally and does not specifically mean natural occurring rubber gum), a hose manufacturer incorporates a reinforcing material. Thus, the hose will consist of an inside sealing membrane—the fluid tight element (inner tube), an inner rubber bonding element, a reinforcing element, an outer rubber bonding element, and finally an abrasive resistant covering. The reinforcing element is usually in the form of steel wire or cable, but also can be polyester or similar organic material, carbon fiber or similar high technology material. The reinforcement generally is used in multiple layers called "plies" which are laid in pairs spirally around the hose inner layers in opposing lay directions.

In order to torque-balance the hose, reinforcing employed by the hose manufacturer that is set down in even layers in alternating lay direction—i.e., 2 layers, 4 layers, 6 layers, etc. Grading systems are used to specify burst pressure classification for hose. For example, in the rotary drilling industry, API Grade C hose has a minimum burst pressure of 10,000 psi, Grade D hose has a minimum burst pressure of 12,500 psi and Grade E hose has a minimum (guaranteed) burst pressure of 18,750 psi.

Generally, a hose manufacturer manufactures flexible hoses to specific parameters set by the purchaser who specifies length, diameter, pressure, service ratings and required end connectors. These flexible hoses are generally referred to as "hose assemblies". In a hose assembly with "built-in" couplings, the manufacturer, either during or after the course of manufacturing the hose, terminates the rubber hose into a metal fitting (the coupling with connector as specified by the purchaser).

One coupling installation technique is to install the end coupling utilizing epoxy fill to lock the reinforcing cables to the coupling. This method is termed a "built-in coupling" for use herein. This technique is used either during the manufacture of the hose or post manufacture of the hose. The post manufacturing installation of the couplings allows cut-to-length hose assemblies, cut from longer hose lengths, to be completed on a quick turn-around basis. For both of these installation procedures, built-in couplings with epoxy fill form the basis of this disclosure.

For a built-in coupling to be installed at the time of the hose manufacturing, each end of the hose would have the outer layers plus the reinforcing layers left bare for later inserting into the couplings. However, for a built-in coupling to be installed with a post manufactured hose, the manufacturer is able to cut the hose to length and then skive (remove) the outer layers of the rubber hose down to the reinforcement layers at each end of the hose. The length of the skive(s) fits within the coupling length. The manufacturer then carefully strips back each reinforcing layer and cleans all rubber compounds, as needed, from that reinforcement. The underlying section(s) of the inner tube are not disturbed. The wire reinforcement is now placed carefully back in place over the inner tube. Also, additional layers of uncured rubber compound, yet to be vulcanized, may be inserted between the inner layer of wire reinforcement and the OD of the inner tube and other locations to assist forming one or more seals between the hose and the coupling. The un-vulcanized rubber placed around the OD of the inner tube will repair any harm done during the initial separation of the inner layer and as well as form a bond after reinforcing wires are replaced and the later vulcanization operation.

In either case, the skived section of the hose is then placed within the end coupling so that the inner tube butts-up against the inside of the coupling nearest it's outboard (opposite hose connection) end and around an inner tube sealing system. Epoxy resin is then poured into the cavity within the coupling thereby filling the void between the hose, the voids between the wire reinforcement, and the inside of the coupling. If needed, the coupling and the hose can then be heated in one or more steps to vulcanize any uncured additional rubber compound and/or enhance the curing of the epoxy resin.

Figure 2:
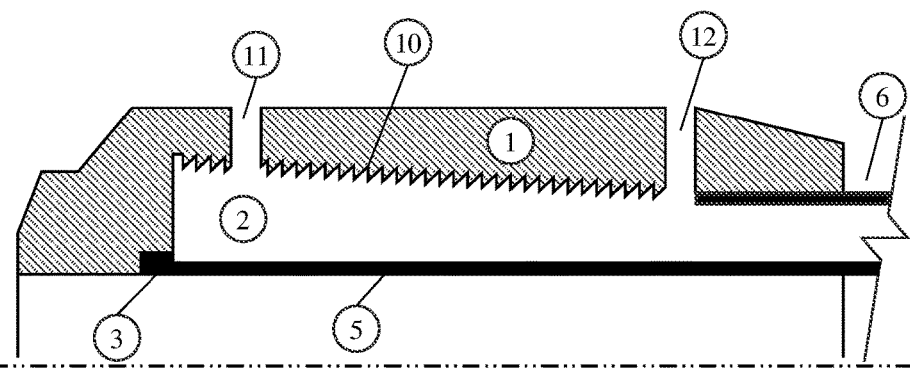
FIG. 2 illustrates metallic sections of a built-in coupling, highlighting the inner tube, outer cover and other major components of a reinforced rubber hose According to one or more examples of the disclosure.

FIG. 2, shows an exaggerated side view of a built-in coupling used in embodiment of the present disclosure. The body of the end-coupling is shown as item 1, the coupling cavity is shown as item 2. Note the wedge shape of the cavity, 2. The wedge angle is exaggerated in the figures in order to demonstrate the mechanical advantage that the wedge offers to prevent coupling pump-off. Further, the cavity 2 can comprise more than one wedge shaped geometries. The epoxy injection port is shown as item 11 and item 12 is the coupling vent port. Item 10 is the serrated gripping surface for the epoxy (now shown). The hose inner tube liner is shown as item 5 and the outer hose cover is shown as item 6. The seal at the leading end of the hose to the coupling is shown as item 3.

Figure 3:
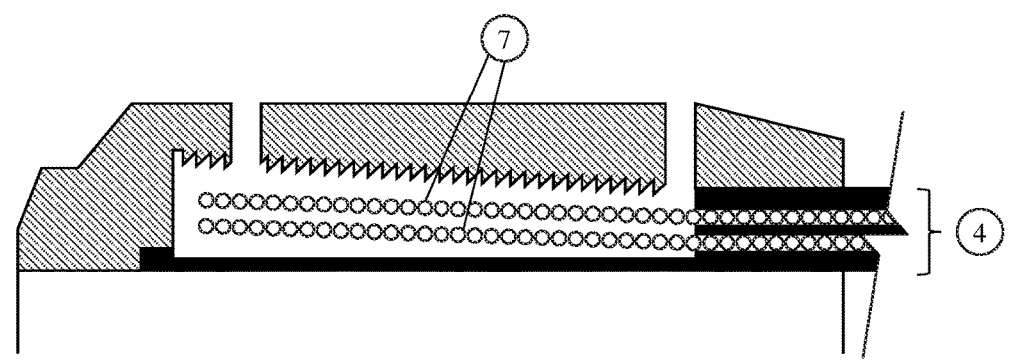
FIG. 3 illustrates an exaggerated side view of a built-in coupling showing a two-ply wire reinforced rubber hose prior to the addition of uncured rubber compound according to one or more examples of the disclosure.

FIG. 3 shows the placement of the flexible rubber hose, 4, and its associated wire reinforcement, 7, within the cavity 2 (FIG. 1), prior to the addition of additional uncured rubber compound and epoxy.

Figure 4:
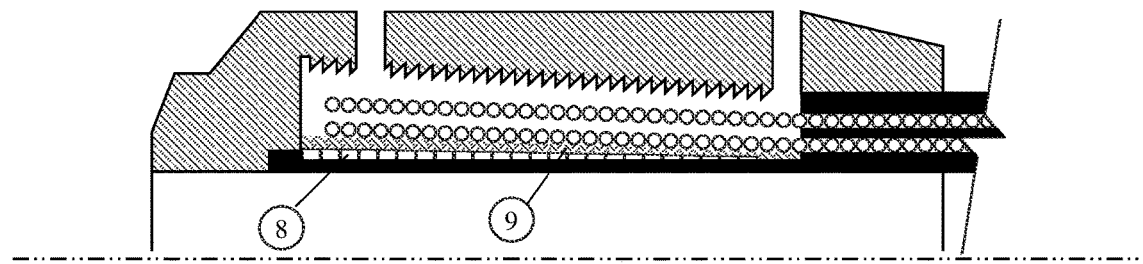
FIG. 4 illustrates a further exaggerated side view of the built-in coupling of FIG. 3 with all components in place prior to the addition of epoxy according to one or more examples of the disclosure.

FIG. 4 shows one embodiment of the built-in coupling, as used in embodiments of the present invention. Note the placement of the un-vulcanized rubber compound, 9, between the spiral conical tapered steel sleeve, 8, and the inner reinforcing layer, 7 (FIG. 3). Note—for clarity, the un-vulcanized rubber compound, 9, is laid around the spiral conical tapered steel tube, 8, as a continuous overlap wrapping. This rubber compound forms a homogeneous layer during the later vulcanization process.

An appropriate length of manufactured reinforced rubber hose is prepared by skiving the outer layers of the hose (to be attached) down to the layers of hose reinforcement. As previously stated, the hose reinforcement is pealed carefully away from the inner tube and cleaned of all rubber compounds. Afterwards the layers of reinforcement are placed back over the inner tube, the un-vulcanized rubber seal, 3 (FIG. 2), is inserted into position on the open end of the hose inner tube and the entire skived end of the hose is inserted into the coupling body, 1 (FIG. 2). The appropriate epoxy resin is poured into the coupling through port 11 (FIG. 2), and air from inside the cavity escapes from port 12 (FIG. 2). Finally, the additional rubber compound is vulcanized and the epoxy heat cured using standard industry methods.

Certain failure modes have been found in known built-in couplings. One of these failures is found in the epoxy used to affect the attachment of the hose reinforcement to the end coupling. Essentially, in known applications, the epoxy was not strong enough when the hose was subjected to high pressure and high frequency impulse loads. Additionally, voids have been found within the epoxy itself which contributed to failures. Thus, there exists a need to strengthen the epoxy and consequent bond between the hose reinforcement and the coupling, and to eliminate voids in the epoxy.

With the present disclosure, it is recognized that, if the epoxy itself could be strengthened, then the bond between the hose reinforcement and the coupling would work far better and the fiber reinforcement in the epoxy could indeed increase the bond strength.

Figure 5:
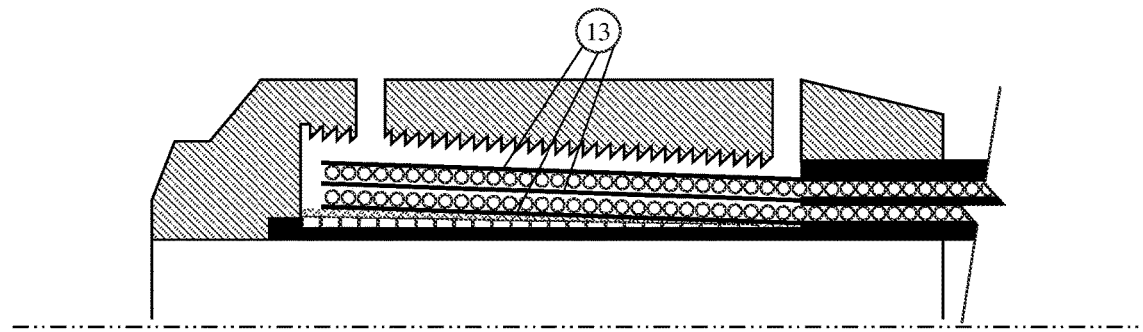
FIG. 5 illustrates an exaggerated side view of the instant disclosure showing the placement of the preferred carbon-fiber reinforcement (be it single filaments or woven cloth like carbon-fiber) according to one or more examples of the disclosure.
Figure 7:
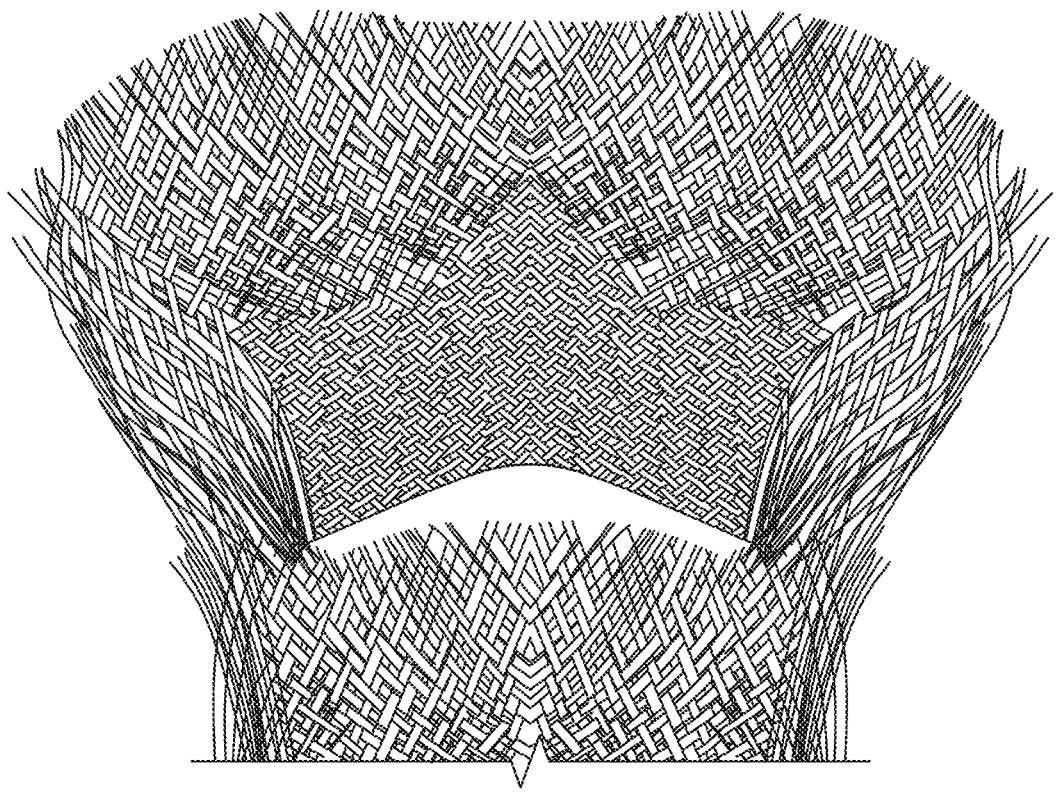
Figure 8:
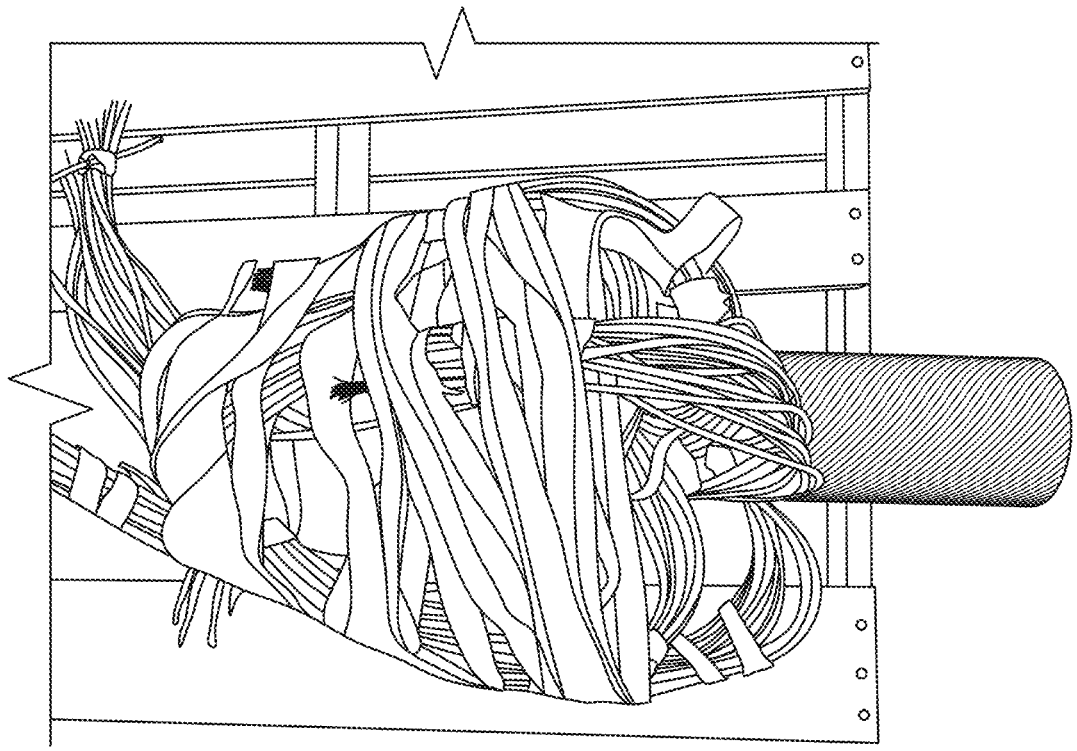
FIG. 8 illustrates the layers of cable reinforcement pulled back from the inner tube, cleaned of rubber compound and ready to be placed back over the inner tube prior to insertion into the built-in coupling according to one or more examples of the disclosure.

As shown in FIG. 5, layers of fiber, 13, are placed between the layers of hose reinforcement, 7, (FIG. 3). These layers of fiber can be formed from individual fiber filaments or pre-woven cloth may be employed. In one embodiment, a carbon-fiber cloth is woven as a cylindrical, helically wound braid sock, usually a common biaxial braid. (See FIG. 7). The advantage of a fiber sock will become readily apparent. The sock can be placed over, for example the un-vulcanized rubber layer and under the inner layer of hose reinforcement. The sock can then be pulled from the open end, while the hose end is held. This will draw the sock down onto the inner layer. This process can be repeated on the same layer, if necessary, to build more fiber reinforcement. This technique is then used in the same manner between the remaining layers of hose reinforcement and on the outside of the outer most reinforcement layer.

Following the addition of the fiber reinforcement, known techniques may be used to complete attachment of the end-coupling (i.e., insertion of the fluid seal, 3 (FIG. 2), addition of rubber compound, 9 (FIG. 4), etc., followed by addition of epoxy and finally the vulcanizing of the added rubber and curing epoxy, as needed.

However, an additional technique is added to embodiments of the instant disclosure in order to not only assure complete filling of the cavity, 2 (FIG. 2), with epoxy resin, but also to improve the bond between the coupling and the hose. This additional technique is vacuum assisted epoxy infusion, which is achieved by applying a vacuum through the coupling vent port, 12 (FIG. 2) thus removing all air from the coupling cavity prior to the introduction of epoxy. Once an acceptable vacuum has been achieved, epoxy would be introduced through the epoxy injection port, 11 (FIG. 2). The epoxy can thereby fill the cavity, 2, and all voids and crevices within, and also where utilized, infuse the epoxy within the carbon-fiber filaments. This vacuum infusion step is beneficial for attaining the maximum strength in the bond between the coupling and the hose reinforcement. The vacuum infusion of the epoxy greatly increases the bond between the hose and the coupling by two means: it greatly increases the shear strength of the epoxy wedge, and it provides much greater grip between the epoxy and the hose reinforcements. Another technique for strengthening the mechanical properties of the epoxy is with the addition of additive substances to the epoxy resin. One such additive that may be used is termed nanoparticles, which have been found to significantly improve the compressive strength of epoxies.

A seal at the leading end of the hose is required as the hose butts into the inside of the coupling, item 3 (FIG. 2), and a seal at the aft end of the coupling and the outer hose cover. But, also it may be necessary to seal air flowing between the reinforcement layers from the opposite end of the hose. Additionally, in the case of cable reinforcement, air may flow through the ID of each individual cable. It should be noted, that if the air leakage is less than the capacity of the vacuum pump, then an acceptable level of vacuum may be achievable without additional steps. Otherwise, depending on where the air leaks are occurring and the volume of air leaks, one of several methods to seal the hose end/coupling may be warranted.

If air leakage is between the reinforcement layers then it may be possible to apply an epoxy dab at the point where the layers are bent back from just prior to the replacement of each reinforcement layer after its cleaning step. This may eliminate or limit the flow of air between the layers from an "open" second hose end.

Figure 6:
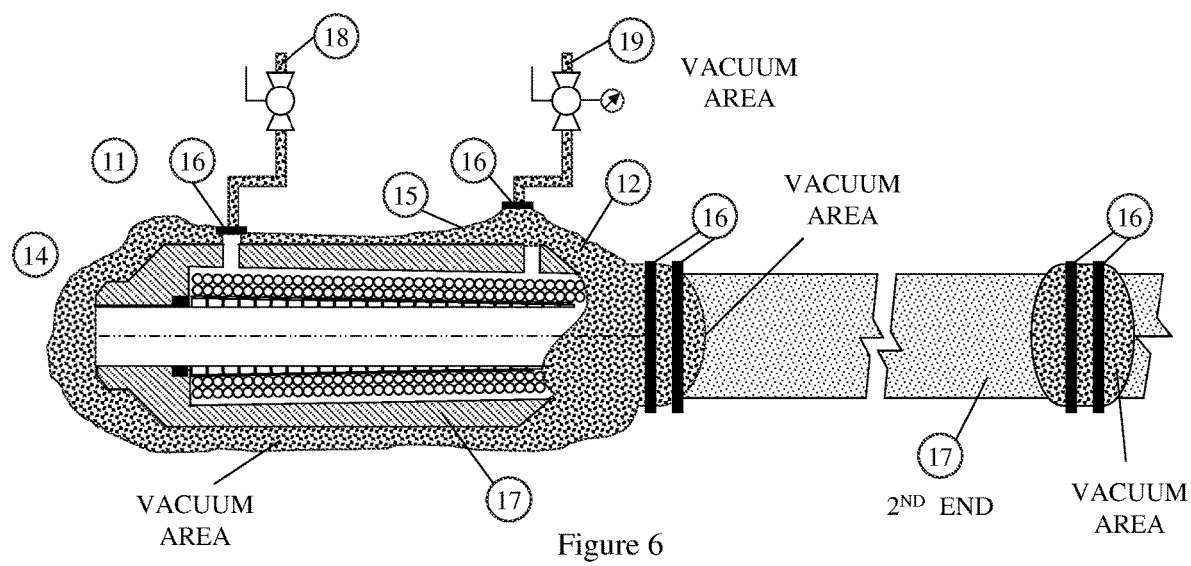
FIG. 6 illustrates a side view of the instant disclosure with vacuum enclosures each end, prior to the addition of epoxy According to one or more examples of the disclosure.

However, if excessive air is leaking through seal 3 (FIG. 2), through the coupling end/hose cover interface, or through cable reinforcement, a more rigorous method to eliminate the air leaks may be necessary. Such method is shown in FIG. 6 and consists of placing a vacuum seal bag around the end coupling/hose assembly. Vacuum seal of both ends, as shown, may be necessary if the excessive air flow through the reinforcement is experienced.

FIG. 6, vacuum bagging is shown as item 14, and vacuum sealing tape is item 16. Since the vacuum needs to surround the entire coupling, a mesh stiffener material is placed at the vacuum port, 12 (FIG. 2) to keep the bag from sucking down and blocking the port. Since the epoxy feed line, 18 and the vacuum pull line, 19 penetrates through the vacuum bag, sealing tape is also placed around the lines at their penetration through the bag. Also, note that the use of an expandable plug seal in the ID of the coupling(s) is also necessary.

If required, at the second hose end, which is depicted as a square cut end although it could be a skived end with the reinforcing layers exposed, an expandable plug, 17, is inserted into its position in the ID and a vacuum seal bag is attached around the coupling utilizing the vacuum seal tape, 16. Again, this sealing of the 2nd end coupling is only necessary if excessive air can travel through the hose between adjacent reinforcement layers and in the case of steel cable reinforcement, through the cable strands themselves. The attachment of the 2nd end vacuum bag and expandable plug will prevent air from replenishing through an open ended hose.

At this stage, a vacuum can be pulled at the 1st end and the air evacuated. Once the vacuum has been achieved, the epoxy can be pumped into the 1st end cavity. Epoxy supply will terminate once epoxy is seen at the inboard vent port, 12. The vacuum bags can now be removed along with the epoxy supply and vacuum hoses and the open ports plugged. The 1st end coupling is now ready for epoxy curing and rubber seal vulcanizing, as needed by heating.

There has been disclosed embodiments of a method (or technique) to manufacture an improved high pressure, reinforced rubber hose assembly with the assembly consisting of built-in couplings attached to the respective ends of an appropriate length of reinforced high pressure rubber hose. The disclosure considers a two-ply reinforced hose, but any form of reinforced rubber hose, 2-ply, 4-ply, 6-ply, etc. and using single wire reinforcement, cable reinforcement, or fiber reinforcement can employ this instant disclosure. Such use is contemplated by this disclosure.

Furthermore, the carbon-fiber preferred reinforcement may easily be any suitable fiber, such as fiber-glass, Kevlar®, Rayon®, Nylon®, Polyester, or similar material. Such materials are anticipated and claimed in this disclosure.

Similarly, vacuum epoxy infusion may be employed in the current state of the art built-in coupling and such use is also anticipated and claimed in this disclosure.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method of attaching a hose coupling to a first end of a reinforced hose, the method comprising:
    obtaining a reinforced hose, the reinforced hose having a skived first end exposing at least one of a plurality of reinforcing layers and having a remaining outer cover portion;
    obtaining a hose coupling having an inner cavity, the inner cavity having a coupling end and an opposing aft end;
    positioning the skived first end of the reinforced hose in the inner cavity, the positioning:
        abutting a leading edge of the skived first end with the coupling end of the inner cavity;
        sealing the leading edge of the skived first end with the coupling end of the inner cavity with a first seal; and
        sealing the outer cover portion with the opposing aft end of the inner cavity with a second seal;
    placing a first vacuum containment device around the hose coupling and remaining outer cover portion;
    sealing the first vacuum containment device to the remaining outer cover portion with a vacuum sealing mechanism;
    introducing a vacuum into the inner cavity through a vent port in the hose coupling while the first vacuum containment device is sealed to the remaining outer cover portion; and
    introducing a supply of bonding agent into the inner cavity through an injection port in the hose coupling while the first vacuum containment device is sealed to the remaining outer cover portion, wherein the bonding agent is drawn by the vacuum into the plurality of reinforcing layers of the reinforced hose; and
    stopping introducing the supply of the bonding agent into the injection port after the bonding agent is detected at the vent port.

2. The method as recited in claim 1, wherein the bonding agent is an epoxy.

3. The method as recited in claim 2, wherein the epoxy bonding agent is modified with the use of additives comprising nanoparticles.

4. The method as recited in claim 1, further including locating carbon-fiber layers between layers of the skived first end prior to positioning the skived first end of the reinforced hose in the inner cavity.

5. The method as recited in claim 4, wherein the carbon-fiber layers comprise pre-woven carbon-fiber.

6. The method as recited in claim 5, wherein the pre-woven carbon-fiber is a cylindrical shape, a helically wound braid, or a biaxial braid open sock.

7. The method as recited in claim 1, further including locating fiber layers between layers of the skived first end prior to positioning the skived first end of the reinforced hose in the inner cavity, wherein the fiber layers are selected from the group comprising: fiberglass, Kevlar®, Rayon®, Nylon®, and polyester.

8. The method as recited in claim 1, wherein the vacuum sealing mechanism is vacuum sealing tape.

9. The method as recited in claim 1, wherein the first vacuum containment device is a first vacuum bag.

10. The method as recited in claim 1, further including, prior to introducing the vacuum and the supply of the bonding agent into the cavity:
    inserting an expandable plug in an inner diameter of a second end of the reinforced hose opposite the skived first end;
    placing a second vacuum containment device around the expandable plug and the remaining outer cover portion; and
    sealing the second vacuum containment device to the remaining outer cover portion with a second vacuum sealing mechanism.

11. The method as recited in claim 10, wherein the second vacuum sealing mechanism is second vacuum sealing tape.

12. The method as recited in claim 10, wherein the second vacuum containment device is a second vacuum bag.

* * * * *